United States Patent
Suzuki et al.

(10) Patent No.: US 6,870,291 B2
(45) Date of Patent: Mar. 22, 2005

(54) STEPPING MOTOR

(75) Inventors: Yuzuru Suzuki, Shizuoka-ken (JP); Taketoshi Ohyashiki, Shizuoka-ken (JP); Kunitake Matsushita, Shizuoka-ken (JP)

(73) Assignee: Minebea Co. Ltd., Nagano-ken (JP)

( * ) Notice: Subject to any disclaimer, the term of this patent is extended or adjusted under 35 U.S.C. 154(b) by 0 days.

(21) Appl. No.: 10/930,601

(22) Filed: Aug. 31, 2004

(65) Prior Publication Data

US 2005/0023918 A1 Feb. 3, 2005

Related U.S. Application Data

(63) Continuation of application No. 10/004,290, filed on Oct. 25, 2001, now Pat. No. 6,791,223.

(30) Foreign Application Priority Data

Oct. 30, 2000 (JP) ........................................ 2000-329953

(51) Int. Cl.[7] .............................................. H02K 21/12
(52) U.S. Cl. ...................................... 310/156; 310/49 R
(58) Field of Search ...................... 310/156.01–156.84, 310/49 R, 68 B, 185

(56) References Cited

U.S. PATENT DOCUMENTS 4,703,211 A * 10/1987 Yazaki et al. ................ 310/179
4,737,674 A * 4/1988 Miyao ......................... 310/268
4,968,913 A   11/1990 Sakamoto
5,107,159 A    4/1992 Kordik
5,705,871 A    1/1998 Suzuki et al.
5,847,483 A   12/1998 Suzuki et al.

FOREIGN PATENT DOCUMENTS

JP            60043060        3/1985

* cited by examiner

Primary Examiner—Darren Schuberg
Assistant Examiner—Nguyen Hanh
(74) Attorney, Agent, or Firm—Fay, Sharpe, Fagan, Minnich & McKee, LLP

(57) ABSTRACT

There is provided a stepping motor of low vibration realized by reducing cogging with a simple structure while maintaining the performances such as torque. A stepping motor of the invention is structured such that a stator unit 18 is composed of a pair of stator sub-assemblies 5, 5 attached to each other in a back to back manner, each stator sub-assembly having a plurality of pole teeth 13 formed at its inner circumference and housing a coil inside thereof, a rotor unit 19 is rotatably disposed with a small gap from the plurality of pole teeth 13 and having multiple magnetic poles formed on ah circumference thereof, the multiple magnetic poles of the rotor unit 19 being formed by magnetizing the rotor unit 19 alternately with an S pole and an N pole in a circumferential direction, and that while a magnetic pole width consisting of a width of the S pole and a width of the N pole in a pair is set to a predetermined constant value, the width of the S pole and the width of the N pole in each pair are set to be different from each other.

5 Claims, 4 Drawing Sheets

P = CONSTANT
W1 < W2

MAGNETIZATION WITH SHIFTING − W / F

STEPPING MOTOR

This application is a continuaton of patent application Ser. No. 10/004,290 which was filed on Oct. 25, 2001 now U.S. Pat. No. 6,791,223 and is still pending.

BACKGROUND OF THE INVENTION

1. Field of the Invention

The present invention relates to a permanent magnet (PM) type stepping motor and, more particularly, configuration of magnetic poles of a rotor.

2. Description of the Prior Art

In recent years, as the performances of various devices such as a printer, a facsimile, and a floppy disk drive become enhanced, a stepping motor is increasingly required to have better performance such as higher torque and better quality such as lower vibration realized by reducing cogging. Although a PM type stepping motor used in various devices has been improved in order to meet such requirements, it is difficult to satisfy both high torque and low vibration which are mutually contradictory.

In a PM stepping motor, a rotor unit is rotatably disposed inside a stator unit and is rotated by interaction between respective magnetic fluxes of the stator unit and the rotor unit. FIG. 1A is a perspective view of a conventional rotor unit 29, and FIG. 1B shows a developed pattern of S poles and N poles magnetized on the circumference of the rotor unit 29.

As shown in FIG. 1A, in the rotor unit 29, a holder 27 is press fitted onto a shaft 23 as a central axis of rotation, and a magnet 24 whose S and N poles are arranged at predetermined intervals in the circumferential direction thereof thereby forming the developed pattern of magnetic poles shown in FIG. 1B is fixed onto the circumferential face of the holder 27 with the holder 27.

As shown in FIG. 1B, the S pole and the N pole are alternately magnetized in such a manner as to have the same width (W1=W2), whereby cogging occurs when a magnetic flux fluctuates.

In a general lamination type motor in which phases are arranged in the circumferential direction, the cogging can be reduced by skewing the magnetic poles of the rotor,or some other methods as well. However, in the PM stepping motor in which phases are arranged in the axial direction, there is almost no countermeasure except skewing the shape of pole teeth, making it difficult to reduce the cogging.

In skewing the shape of the pole teeth for reducing the cogging, the skewing work is carried out by processing a sheet metal, so a die is necessary for prototyping, which requires a lot of expense and time and, moreover, which makes it difficult to maintain precision. Therefore, the cogging could not be easily reduced.

The invention has been made in consideration of the above and it is therefore an object of the invention to provide a stepping motor of low vibration realized by reducing cogging with a simple structure while maintaining the performances such as torque requirements.

SUMMARY OF THE INVENTION

According to the invention, in a stepping motor in which a stator unit is composed of a pair of stator sub-assemblies attached to each other in a back to back manner, each stator sub-assembly having a plurality of pole teeth formed at its inner circumference and housing a coil inside thereof, and a rotor unit is rotatably disposed with a small gap from the plurality of pole teeth and has multiple magnetic poles formed on a circumference thereof, the multiple magnetic poles of the rotor unit being formed by magnetizing the rotor unit alternately with an S pole and an N pole in the circumferential direction, a magnetic pole width consisting of a width of the S pole and a width of the N pole in a pair is set to a predetermined constant value with the width of the S pole and the width of the N pole in each pair set to be different from each other.

The width of the S pole and the width of the N pole in each pair are different from each other by an electrical angle ranging from 15 degrees to 50 degrees.

Further, one pair of the S pole and the N pole in which the width of the S pole is set to be smaller than the width of the N pole and another pair of the S pole and the N pole in which the width of the S pole is set to be larger than the width of the N pole are alternately arranged.

DETAILED DESCRIPTION OF THE PREFERRED EMBODIMENT

The invention will now be described hereinbelow by reference to accompanying drawings.

Figure 2:
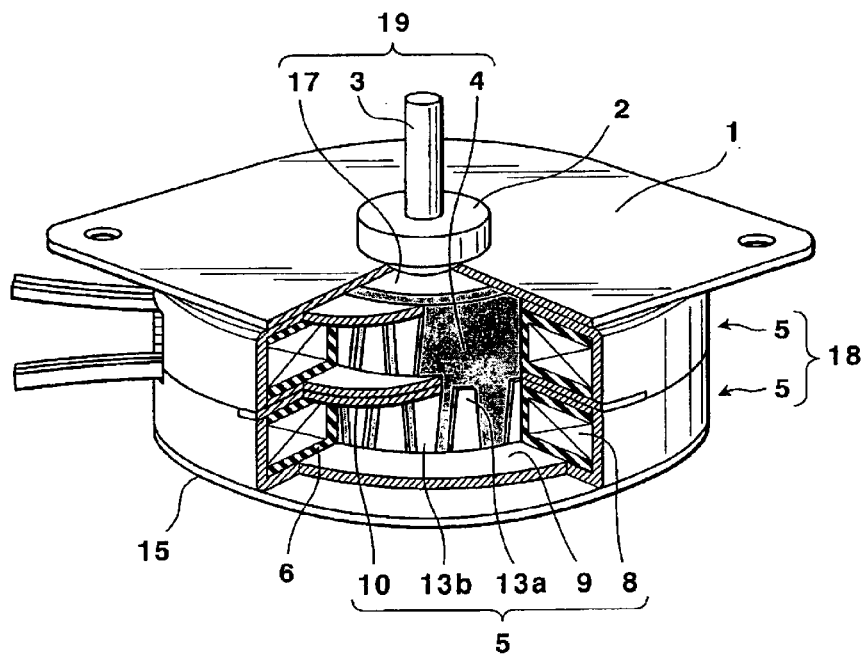
FIG. 2 is a partial cutaway perspective view of a PM type stepping motor according to the invention.

FIG. 2 is a partial cutaway perspective view of a PM (Permanent Magnet) type stepping motor according to the invention.

As shown in FIG. 2, the PM type stepping motor is constructed mainly by a stator unit 18 and a rotor unit 19. The stator unit 18 includes a pair of stator sub-assemblies 5, 5. Each stator sub-assembly 5 comprises stator yokes 9 and 10 and houses a coil 8 inside thereof. The stator yokes 9 and 10 are made of a steel plate of a soft magnetic material, have a plurality of respective pole teeth 13a and 13b (generically referred to as pole teeth 13 when appropriate) orthogonally bent, and are coupled to each other to form a doughnut shape with the plurality of pole teeth 13 at its inner circumference. The coil 8 is composed such that a magnet wire is wound on a bobbin 6. Two stator sub-assemblies 5, 5 are attached to each other in a back to back manner and integrally molded by resin, and flanges 1 and 15 manufactured by punching a stainless steel plate are fixed to the respective stator sub-assemblies 5.

On the other hand, the rotor unit 19 is composed such that a holder 17 made of a resin, around which a magnet 4 is fixed, is press-fitted onto a shaft 3 as a central axis of rotation. The shaft 3 is rotatably disposed in a bearing 2 and a bearing 16 (refer to FIG. 4) fixed at the center of the flanges 1 and 15, respectively.

Figure 3:
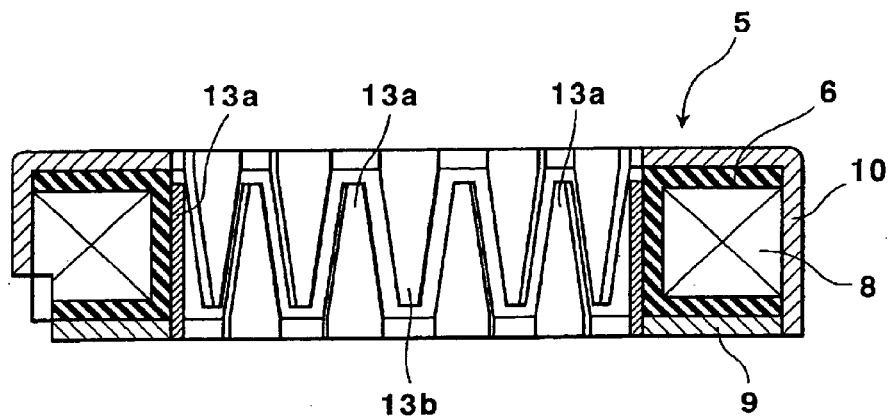
FIG. 3 is a cross section of the configuration of a stator sub-assembly of the PM type stepping motor according to the present invention.

FIG. 3 shows a cross section of the configuration of the stator sub-assembly 5.

The stator sub-assembly 5 is constructed such that the stator yoke 9 is coupled to the stator yoke 10 so as to have its pole teeth 13a engaged with the pole teeth 13b of the stator yoke 10 at regular intervals and that the coil 8 provided around the bobbin 6 is disposed inside the stator yokes 9 and 10 coupled.

Figure 4:
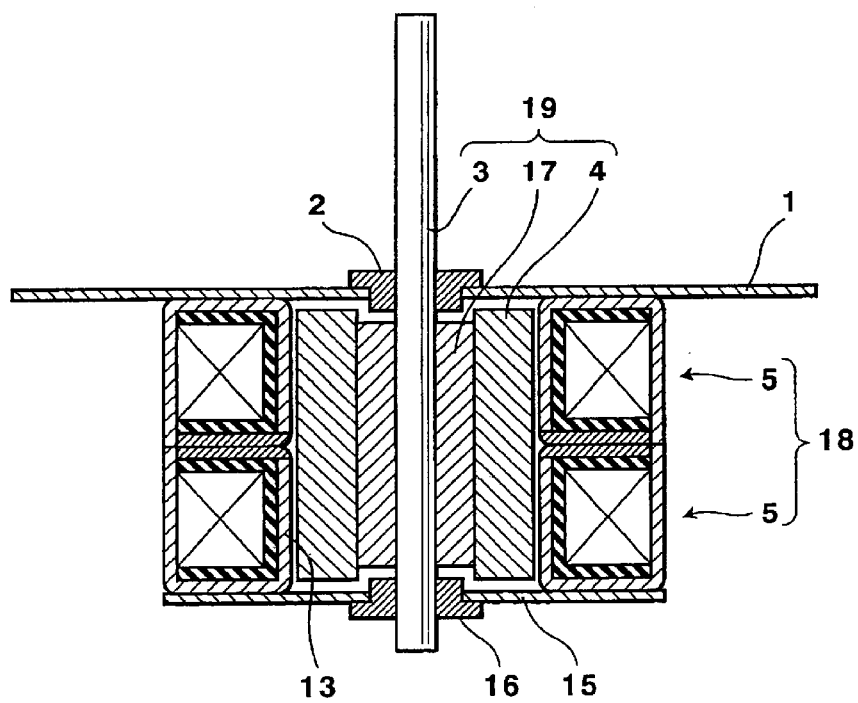
FIG. 4 is a vertical cross section of the PM type stepping motor according to the invention.

FIG. 4 shows a vertical cross section of another embodiment of the PM type stepping motor according to the invention.

In this embodiment, the stator sub-assembly 5 has the same structure as shown in FIG. 3. A rotor unit 19 is fabricated in such a manner that the holder 17 made of a resin is press-fitted onto the shaft 3 as a central axis of rotation, and that the magnet 4 is coaxially and fixedly arranged on the outer circumferential surface of the holder 17. The magnet 4 may be fixed to the holder 17 by insert-molding or press-fitting.

The rotor unit 19 thus fabricated is arranged in such a manner that the shaft 3 is rotatably held by the bearings 2 and 16 fixed by caulking or the like at the center of the flanges 1 and 15, respectively, so that the magnet 4 faces the pole teeth 13 of the stator sub-assembly 5 with a small gap therefrom. The flanges 1 and 15 are fixed to the respective stator sub-assemblies 5 by projection welding or the like.

Figure 5A:
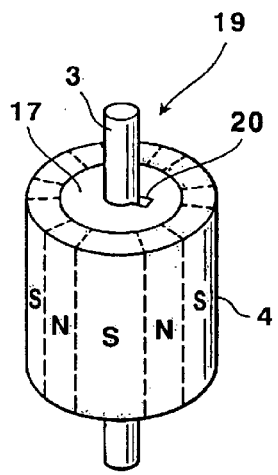
FIG. 5A is a perspective view of a rotor unit of the PM type stepping motor according to the invention.
Figure 5B:
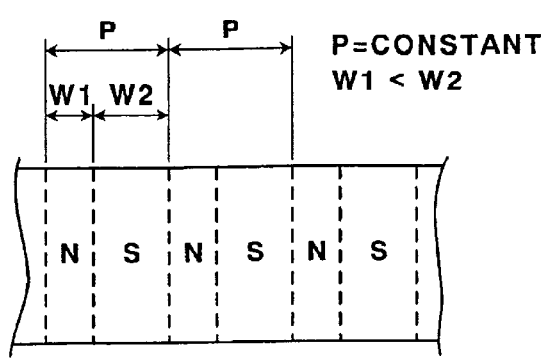
FIG. 5B shows a developed pattern of S and N poles magnetized on the circumference of the rotor unit shown in FIG. 5A.

FIG. 5A is a perspective view of the rotor unit 19 used in the PM type stepping motor according to the invention and FIG. 5B shows a developed pattern of the S and N poles magnetized on the surface of the rotor unit 19.

As shown in FIG. 5A, the holder 17 is press-fitted to the shaft 3 as a central axis of rotation, and the magnet 4 is coaxially and fixedly arranged onto the outer circumferential surface of the holder 17. The rotor unit 19 thus structured has the magnet 4 magnetized at predetermined intervals in the circumferential direction with a magnetizer (not shown), thereby forming a developed pattern of magnetic poles shown in FIG. 5B.

As shown in FIG. 5B, the developed pattern of magnetic poles is formed by alternate magnetization of S and N poles, and a magnetic pole width P consisting of a width W2 of the S pole and a width W1 of the N pole in a pair is set to a predetermined constant value, whereas the width W2 of the S pole and the width W1 of the N pole in each pair are set to be different from each other such that the width W2 of the S pole is larger than the width W1 of the N pole.

Operation of the PM type stepping motor of the embodiment will now be described by referring to FIG. 2 to FIGS. 5A and 5B.

The rotor unit 19 is rotated by the interaction of magnetic fluxes of the stator unit 18 and the rotor unit 19. When a pulse drive voltage is applied to the coils 8 of the stator unit 18, magnetic flux is generated. The magnetic flux flows from one of the pole teeth 13 of the stator unit 18 to one of the S poles of the rotor unit 19 and flows backward, by way of an N pole located next to the S pole, to another pole tooth 13 located next to the pole tooth from which the magnetic flux has flowed. This process of flowing is sequentially repeated, whereby the rotor unit 19 is rotated.

Figure 6:
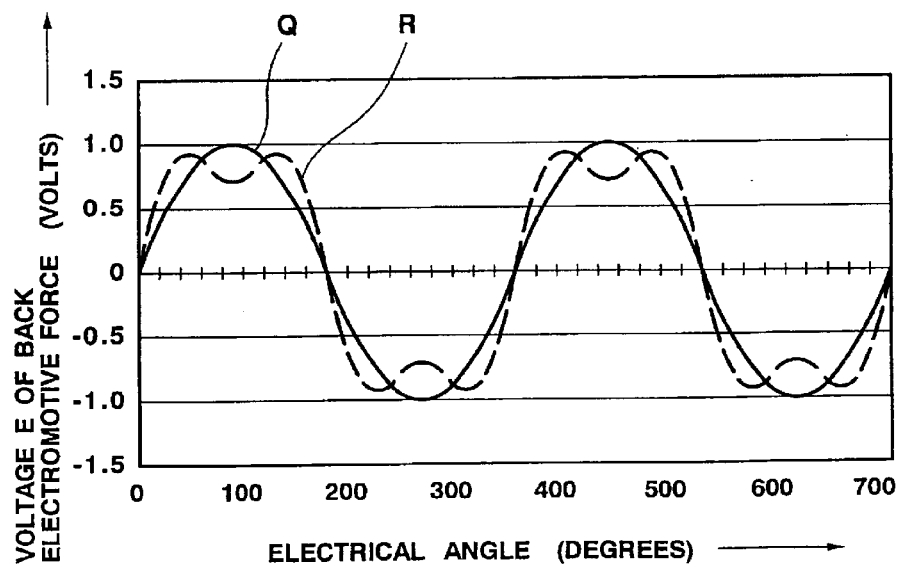
FIG. 6 is a characteristic diagram of a voltage E of back electromotive force with respect to an electrical angle of the rotation by the rotor unit in the PM type stepping motor according to the invention.

FIG. 6 shows a characteristic diagram of voltage E of back electromotive force with respect to an electrical angle of the rotation by the rotor unit 19 in the PM type stepping motor according to the invention.

Figure 1A:
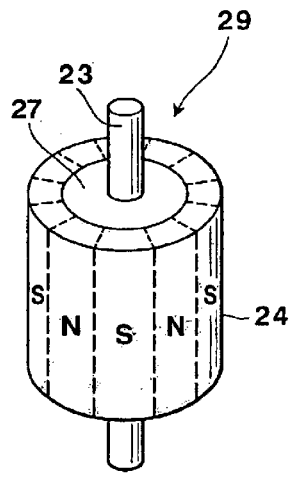
FIG. 1A is a perspective view of a rotor unit of a conventional PM type stepping motor and FIG. 1B shows a developed pattern of S and N poles magnetized on the circumference of the rotor unit shown in FIG. 1A.
Figure 1B:
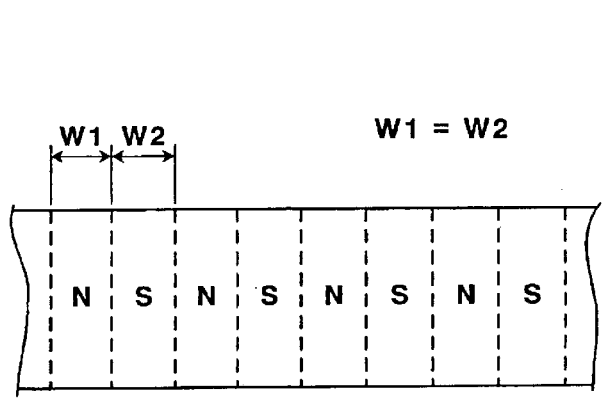

Referring to FIG. 6, R denotes the voltage characteristic of the back electromotive force for the conventional PM type stepping motor shown in FIG. 1A, while Q denotes the voltage characteristic of the back electromotive force for the PM type stepping motor according to the invention, where a shifted amount between the width of the S pole and the width of the N pole in each pair is set to 50 degrees in terms of electrical angle.

As shown in FIG. 6, the voltage characteristic R of the back electromotive force for the conventional PM type stepping motor has sharp rising and falling edges and draws a recess around each peak of the curve. In contrast, the voltage characteristic Q of the back electromotive force for the PM type stepping motor according to the invention has a smooth sine wave.

Figure 7:
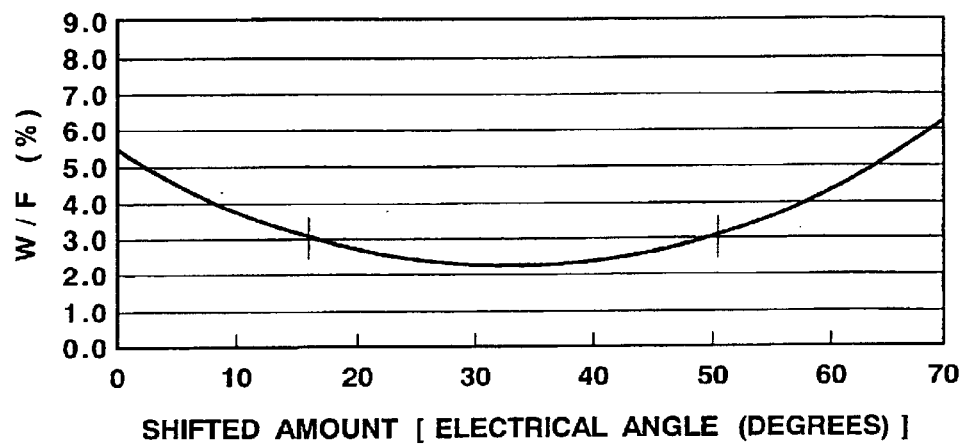
FIG. 7 shows an experimental characteristic diagram of wow and flatter (W/F in percent) with respect to a shifted amount (electrical angle in degree) between the widths of S and N poles in a pair.

FIG. 7 is a characteristic diagram of wow and flutter (W/F (%)) that has been experimentally obtained with respect to a shifted amount (electrical angle) between the widths of the S and N poles of each pair.

It is confirmed that when the shifted amount (electrical angle) ranges from 15 degrees to 50 degrees, the wow and flutter (W/F (%)) is 3.0% or less and both the characteristics of the back electromotive force shown in FIG. 6 follow closely the smooth sine wave and that when the shifted amount is larger than 50 degrees or smaller than 15 degrees, the characteristics deviate from the sine wave, as shown in FIG. 7.

As described above, in the PM type stepping motor according to the invention, the voltage characteristic Q of the back electromotive force can form a smooth sine wave for the following reason. As the width of the N pole in a pair is set to be smaller than the width of the S pole, the magnetic flux passing the N pole is eased at the rising and falling edges, and because the voltage characteristic Q of the back electromotive force corresponds to the torque characteristic, a smooth torque characteristic can be obtained, so that reduction in cogging can be easily achieved.

In the PM type stepping motor of the above embodiment, it is therefore possible to provide the voltage characteristic Q of the back electromotive force in a smooth sine wave, and to achieve low vibration by reducing cogging with a simple structure in which the width of the S pole and the width of the N pole in each pair are set to be different from each other while maintaining electrical performances such as torque.

Figure 8A:
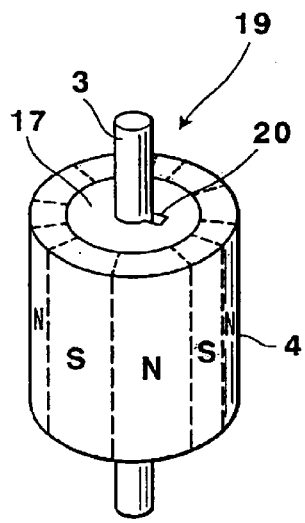
FIG. 8A is a perspective view of another embodiment of the rotor unit of the PM type stepping motor according to the invention.
Figure 8B:
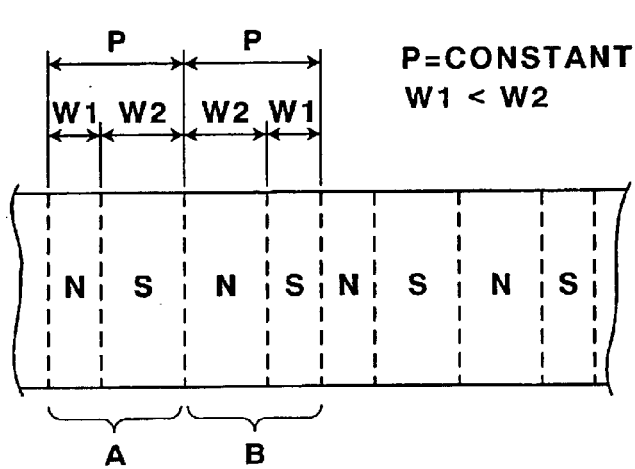
FIG. 8B shows a developed pattern of S and N poles magnetized on the circumference of the rotor unit shown in FIG. 8A.

FIG. 8A is a perspective view of another embodiment of the rotor unit 19 of the PM stepping motor according to the invention. FIG. 8B shows a developed pattern of S and N poles magnetized on the surface of the rotor unit 19 shown in FIG. 8A. The rotor unit 19 has the same structure as that shown in FIG. 5A except the developed pattern of S and N poles.

The difference in the developed pattern of the S and N poles from that shown in FIG. 5B is that as seen from FIG. 8B, the width of the S pole and the width of the N pole in one pair are set to be reverse to those widths of the S and N poles in an adjacent pair. More particularly, in one pair A of the S and N poles, the width W1 of the N pole is set to be smaller than the width W2 of the S pole, while in an adjacent pair B, a width of the N pole is set to the width W2 and is larger than a width of the S pole which is set to the width W1. The same relation is established in sequence between two adjacent pairs of the S and N poles as shown in FIG. 8B.

In a manner similar to the foregoing embodiment, it is therefore possible to obtain the voltage characteristic Q of the back electromotive force which has a smooth sine wave, so that electrical performances such as torque are maintained and low vibration is achieved by reducing cogging with a simple structure in which the width of the S pole and the width of the N pole in each pair are simply set to be different from each other with the setting reversed alternately. According to the invention, in a stepping motor in which a stator unit is composed of a pair of stator sub-assemblies attached to each other in a back to back manner, each stator sub-assembly having a plurality of pole teeth formed at its inner circumference and housing a coil inside thereof, and a rotor unit is rotatably disposed with a small gap from the plurality of pole teeth and has multiple magnetic poles formed on a circumference thereof, the multiple magnetic poles of the rotor unit being formed by magnetizing the rotor unit alternately with an S pole and an N pole in the circumferential direction, a magnetic pole width consisting of a width of the S pole and a width of the N pole in a pair is set to a predetermined constant value with the width of the S pole and the width of the N pole in each pair set to be different from each other. With the configuration, the voltage characteristic of the back electromotive force formes a smooth sine wave, so that the performances such as torque are maintained and low vibration can be achieved by reducing cogging with the simple structure.

The width of the S pole and the width of the N pole in each pair are made different from each other by an electrical angle ranging from 15 degrees to 50 degrees. Thus, cogging can be effectively reduced, thereby lowering vibration.

Further, one pair of the S pole and the N pole in which the width of the S pole is set to be smaller than the width of the N pole and another pair of the S pole and the N pole in which the width of the S pole is set to be larger than the width of the N pole are alternately arranged. Consequently, cogging can be appropriately reduced, and vibration can be lowered.

What is claimed is:

1. A stepping motor comprising:
   a stator unit comprising a pair of stator sub-assemblies integrally attached to each other in a back to back manner, each of the stator sub-assemblies including:
      a plurality of pole teeth formed at an inner circumference of the sub-assembly and housing a coil inside thereof; and
      a rotor unit rotatably disposed with a small gap from the plurality of pole teeth and having multiple magnetic poles formed on a circumference thereof, the multiple magnetic poles being formed by magnetizing the rotor unit alternatively with an S pole and an N pole in a circumferential direction, wherein at least one first pair of the S pole and the N pole has the width of the at least one first paired S pole set to be smaller than the width of the at least one first paired N pole, and at least one second pair of the S pole and the N pole has the width of the at least one second paired S pole set to be larger than the width of the at least one second paired N pole.

2. The stepping motor according to claim 1, wherein the width of the S pole and the width of the N pole in each of the at least one first pair and the at least one second pair are different from each other by a constant electrical angle ranging from 15 degrees to 50 degrees.

3. The stepping motor according to claim 1, wherein the at least one first pair of the S pole and the N pole and the at least one second pair of the S pole and the N pole are alternately arranged.

4. The stepping motor according to claim 3, wherein a first total width of the first pair of the S pole and the N pole equals a second total width of the at least one second pair of the S pole and the N pole.

5. The stepping motor according to claim 4, wherein the first and second total width are constant.

* * * * *